United States Patent [19]

Kawakami et al.

[11] 4,304,807
[45] Dec. 8, 1981

[54] MAGNETIC RECORDING TAPE

[75] Inventors: Yoshio Kawakami, Toobumachi; Yoneo Matsuzawa, Saku, both of Japan

[73] Assignee: TDK Electronics Co. Ltd., Tokyo, Japan

[21] Appl. No.: 49,985

[22] Filed: Jun. 19, 1979

[30] Foreign Application Priority Data

Jun. 20, 1978 [JP] Japan .................................. 53/74502

[51] Int. Cl.$^3$ .............................................. G11B 5/78
[52] U.S. Cl. ...................... 428/148; 360/134; 428/150; 428/330; 428/331; 428/409; 428/483; 428/694; 428/900
[58] Field of Search ............... 428/900, 480, 910, 147, 428/143, 409, 148, 149, 150, 483, 323, 327, 328, 329, 331, 330, 694; 427/128, 127, 129; 260/40 R; 360/134

[56] References Cited

U.S. PATENT DOCUMENTS

| | | | |
|---|---|---|---|
| 3,821,156 | 6/1974 | Farrar ................................ | 260/40 R |
| 3,958,064 | 5/1976 | Brekken et al. ..................... | 428/900 |
| 3,967,025 | 6/1976 | Tanabe et al. ...................... | 428/480 |
| 3,983,285 | 9/1976 | Riboulet et al. .................... | 428/480 |
| 4,071,654 | 1/1978 | Ogawa et al. ....................... | 428/900 |
| 4,097,650 | 6/1978 | Shirahata et al. ................... | 427/128 |
| 4,112,187 | 9/1978 | Asakura et al. ..................... | 427/128 |
| 4,135,031 | 1/1979 | Akashi et al. ....................... | 427/129 |
| 4,163,823 | 8/1979 | Legras et al. ....................... | 427/128 |
| 4,233,352 | 11/1980 | Ono et al. ........................... | 428/900 |

FOREIGN PATENT DOCUMENTS 2807147 9/1978 Fed. Rep. of Germany ...... 428/409

Primary Examiner—Stanley S. Silverman
Attorney, Agent, or Firm—Armstrong, Nikaido, Marmelstein & Kubovcik

[57] ABSTRACT

A magnetic recording tape comprising a polyethylene terephthalate substrate and a magnetic material-containing layer closely adhered onto the substrate, which tape exhibits a reduced envelope variation. The polyethylene terephthalate substrate satisfies the formula:

$$0.051H_1 - 0.59A + 0.14 \Delta n + 0.0015 (H_2 - 66.67)^2 + 50.92 \leq 20$$

wherein A is the average particle size of the polyethylene terephthalate crystals as determined from the half height width by X-ray diffractometry, and $H_1$ is the average number of projections present in a unit area of 1 mm$^2$ on the surface of the substrate, which projections have a height falling within the range of from 0.27 to 0.53 micron, $H_2$ is the average number of projections similar to $H_1$ above but having a height falling within the range of from 0.54 to 0.80 micron, rather than 0.27 to 0.53 micron, and $\Delta n$ is the birefringence of the substrate.

6 Claims, 1 Drawing Figure

MAGNETIC RECORDING TAPE

BACKGROUND OF THE INVENTION

This invention relates to a magnetic recording tape exhibiting a reduced envelope variation.

Polyethylene terephthalate is popularly used in magnetic recording tapes, such as audio tapes and video tapes, as a substrate material on which a magnetic material layer is to be formed. Audio and video properties and other physical properties of magnetic recording tapes vary depending upon not only the magnetic material layer but, also, the substrate.

SUMMARY OF THE INVENTION

It now has been found that the physical properties of a magnetic recording tape prepared from a polyethylene terephthalate substrate, particularly the envelope variation observed upon reproducing the recorded tape, are greatly influenced by the size of the polyethylene terephthalate crystals, and the surface roughness and the birefringence of the polyethylene terephthalate substrate.

The main object of the present invention is to provide a magnetic recording tape having a polyethylene terephthalate substrate, which tape exhibits a reduced variation in the envelope observed upon reproducing the recorded tape.

In accordance with the present invention, there is provided a magnetic recording tape comprising a polyethylene terephthalate substrate and a magnetic material-containing layer closely adhered onto the substrate, characterized in that said polyethylene terephthalate substrate satisfies the formula (1):

$$0.051H_1 - 0.59A + 0.14\Delta n + 0.0015(H_2 - 66.67)^2 + 50.92 \leq 20 \quad (1)$$

wherein A is the average particle size of the polyethylene terephthalate crystals, determined as hereinafter mentioned, $H_1$ is the average number of projections present in a unit area of 1 mm$^2$ on the surface of the substrate, which projections have a height fulling within the range of from 0.27 to 0.53 micron, and $H_2$ is the average number of projections similar to $H_1$ above but having a height falling within the range of from 0.54 to 0.80 micron, rather than 0.27 to 0.53 micron, and $\Delta n$ is the birefringence of the substrate.

Figure 1:
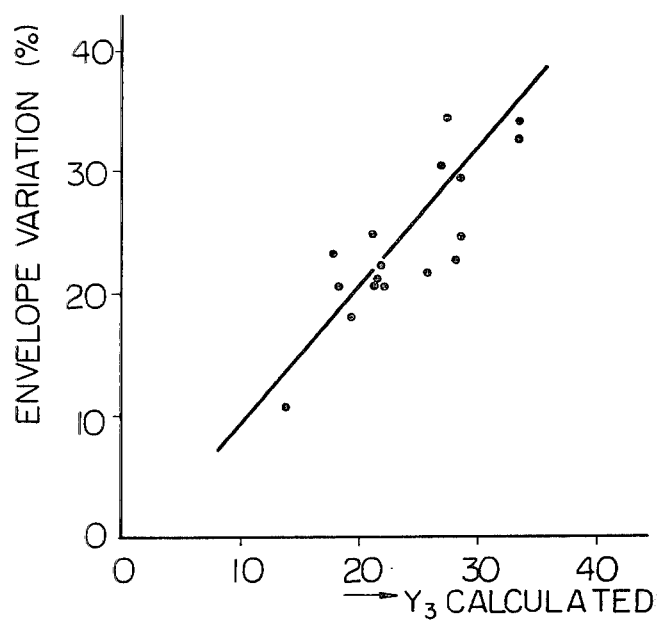
FIG. 1 is a graph showing the correlation of the envelope variation in % (ordinate) of the magnetic recording tape with the $Y_3$ value (abscissa) calculated from the formula (2)

$$Y_3 = 0.051H_1 - 0.59A + 0.14\Delta n + 0.0015(H_2 + 66.67)^2 + 50.92 \quad (2)$$

wherein A, $\Delta n$, $H_1$ and $H_2$ are as hereinbefore defined.

DETAILED DESCRIPTION OF THE PREFERRED EMBODIMENT

The polyethylene terephthalate (hereinafter referred to as "PET" for brevity) substrate of the magnetic recording tape of the invention is characterized as exhibiting the crystal particle size A, the surface and the birefringence, all of which factors satisfy the aforesaid formula (1).

The term "crystal particle size A", used herein, refers to the crystal particle size calculated from the equation:

$$A = (0.9 \times \lambda)/B \cos \theta$$

wherein A is the particle size of crystal in angstrom, B is the half height width in radian as determined as follows, $\theta$ is Bragg angle and $\lambda$ is 2.2896 (angstroms).

The half height width is determined on the [100] plane of a crystal specimen by using an X-ray diffraction apparatus (Model 4011-B2 supplied by RIGAKU ELECTRIC CO.). In this determination, a line drawn between two points corresponding to scattering strengths at $2\theta = 50°$ and $2\theta = 20°$, respectively, is employed as the base line.

The crystal particle size A is usually in the range of from approximately 45 to 75 angstroms. The crystal particle size A can be varied by suitably selecting the conditions under which the PET film is prepared. Particularly, the crystal particle size greatly varies depending upon the temperature at which the biaxially drawn PET film is heat-set. The higher the heat-setting temperature, the larger the crystal particle size. Generally, the intended crystal particle size can be obtained by suitably determining the heat-setting temperature in the range of from 180° C. to 230° C.

The PET substrate has the surface roughness defined by $H_1$ and $H_2$ above, satisfying the aforesaid formula (1). The PET substrate having projections on the surface can be prepared as follows.

(a) Dialkyl terephthalate and ethylene glycol are interesterified in the presence of calcium acetate as an ester-interchange catalyst, followed by polycondensation of the interesterified product under normal conditions, thereby to precipitate particles of the calcium compounds represented by the following formula, i.e, calcium stearate or a calcium salt of a PET oligomer, during the polycondensation.

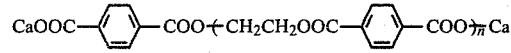

wherein n is an integer of from 0 to 3.

Alternatively, particles of the aforesaid calcium compounds previously prepared may be incorporated in the polycondensation reaction mixture.

(b) Particles of inorganic substances, such as kaolin and calcium carbonate, are incorporated into the polycondensation reaction mixture or into the molten PET in the step of forming the film.

The aforesaid methods (a) and (b) may be employed alone or in combination. The height and density of projections present on the substrate surface can be varied by suitably selecting the amount and particle size of the particles to be formed or incorporated in the aforesaid methods (a) and (b).

The "birefringence ($\Delta n$)" used herein is determined as follows. Using a polarization microscope (Model POH supplied by Nippon Kogaku K.K.), a retardation R ($\mu m$) is measured wherein white light projected from the light source is transmitted through a green filter (546.1 $\mu m$) and a compensator. Birefringence ($\Delta n_1$) is calculated from the retardation R, so measured, according to the equation:

$$\Delta n_1 = R/d$$

wherein d is thickness of film specimen in μm. The birefringence ($\Delta n_1$), so calculated, is corrected according to the equation:

Corrected birefringence $\Delta n = 1,000$
$n_1/(0.009X^3 - 0.113X^2 + 2.114X + 100.299)$ wherein X is the deviated angle in degree of the molecular orientation direction from the longitudinal direction.

The corrected birefringence $\Delta n$ is expressed in a plus number when $n\gamma - n\beta > 0$, and in a minus number when $n\gamma - n\beta < 0$, where $n\gamma$ and $n\beta$ are corrected birefringences as determined on the longitudinal direction of the film specimen and on the transverse direction thereof, respectively.

The birefringence can be varied by suitably selecting the proportion of the drawing ratio (i.e, the ratio of the length after drawing to the length before drawing in the longitudinal direction of the drawing ratio in the transverse direction in the step of biaxially drawing the PET film. Generally, both the drawing ratios in the longitudinal direction and in the transverse direction may be in the range of from approximately 2 to 5. The birefringence is usually in the range of from −46 to about 20.

Referring to FIG. 1, points plotted therein correspond to the data of envelope variation shown in the table, below. It will be seen from FIG. 1 that the envelope variation of the magnetic recording tape has a good correlation with the value $Y_3$ expressed by the formula (2). The coefficient of correlation in FIG. 1 is 0.85. Thus, the PET substrate having a $Y_3$ value of 20 or less exhibits an envelope variation of approximately 20 or less.

The $Y_3$ value can be generally decreased to approximately 10. That is, the $Y_3$ value of the PET substrate of the invention may be varied, generally in the range of from 20 to 10.

The magnetic material layer formed on the PET substrate may be conventional. That is, the magnetic material layer can be comprised of approximately 60 to 80% by weight of a finely divided magnetic material, such as maghemite ($\gamma$-$Fe_2O_3$), $CrO_2$, Fe-Co alloy, magnetite ($Fe_3O_4$) and Co-doped or -adsorbed $\gamma$-$Fe_2O_3$, and approximately 20 to 40% by weight of a binder resin. The binder resin includes, for example, a thermoplastic resin, such as a vinyl chloride/vinyl acetate copolymer, a styrene/butadiene copolymer, nitrocellulose, cellulose acetate or cellulose butyrate, or a thermosetting resin, such as a polyurethane resin, an epoxy resin or a melamine resin. Additives, such as a plasticizer, a dispersing agent, a lubricant and a colorant, may be incorporated in the magnetic material layer.

The formation of the magnetic material layer on the substrate may be carried out in a conventional manner, wherein a magnetic material, a binder resin and other additives are slurried in a suitable solvent, and then, the slurry is coated on the substrate, followed by drying and heat-treating.

The invention will be further illustrated by the following example, wherein percents and parts are by weight unless otherwise specified.

EXAMPLE 100 parts of dimethyl terephthalate and 70 parts of ethylene glycol were heated in the presence of 0.035 part of manganese acetate to effect ester exchange reaction. To the reaction product, there was added 0.04 part of antimony trioxide, 0.15 part of lithium acetate (dissolved in ethylene glycol), calcium acetate and calcium carbonate (dispersed in ethylene glycol). The amounts of calcium acetate and calcium carbonate were varied in the ranges of from 0 to 0.20 part and from 0 to 0.06 part, respectively. The average particle size of the calcium carbonate was varied in the range of from 0.01 to 3 microns. Thereafter, 0.13 part of trimethyl phosphate was added to the mixture. Then, the resulting mixture was heated to effect polycondensation. The polyethylene terephthalate, so prepared, had an intrinsic viscosity of 0.620.

The PET was melt-extruded in a conventional manner and, then, the extrudate was drawn, first in the longitudinal direction and then in the transverse direction. The drawing ratio was varied in the range of from 2 to 5 times of the original length both in the longitudinal and transverse directions. Each drawn film was heat-set at various temperatures of from 180° to 230° C. The heat-set film had a thickness of about 15 microns.

Crystal particle size, birefringence and surface roughness of the PET films, so prepared, are shown in the table, below.

Each PET film was surface-treated by corona discharge at 10 watt min/$m^2$ and, then, coated with a magnetic material-containing coating slurry by a doctor blade coating procedure. The coat thickness was 5.5 microns, in terms of dry coat thickness. The coating slurry was composed of 70 parts of Co-adsorbed $\gamma$-$Fe_2O_3$, 30 parts of a binder resin (15 parts of a urethane rubber, 10.5 parts of nitrocellulose and 4.5 parts of polyvinyl chloride) and 270 parts of methyl ethyl ketone. The coating slurry further contained an isocyanate hardener ("Desmodule L" supplied by Bayer A.G.) in an amount of 15% based on the weight of the binder resin. The coated film was air-dried and, then, heat-treated at a temperature of 60° C. for 24 hours.

The physical properties of the magnetic recording tapes, so prepared, are shown in the table, below.

TABLE

| Run No. | Paticle size (angstroms) | Birefringence (n) | Roughness H$_1$ | H$_2$ | H$_3$ | S/N (dB) | Envelope variation (%) | Adhesion (g) | Dropout number increase |
|---|---|---|---|---|---|---|---|---|---|
| 1* | 62.7 | −8.4 | 306.4 | 153.9 | 3.8 | −0.1 | 32.9 | 30.5 | 76.0 |
| 2* | 71.0 | −6.7 | 133.3 | 30.8 | 0 | 1.1 | 21.3 | 42.0 | 766.9 |
| 3* | 58.4 | +20.4 | 59.0 | 35.9 | 0 | 1.1 | 29.5 | 26.7 | 19.6 |
| 4* | 61.3 | −3.9 | 269.2 | 156.4 | 3.8 | 0.5 | 34.1 | 30.6 | 0 |
| 5* | 66.8 | −31.4 | 152.6 | 33.3 | 0 | 0.6 | 25.0 | 25.0 | 0 |
| 6* | 67.2 | −7.8 | 185.9 | 66.7 | 0 | 1.1 | 20.9 | 27.0 | 298.0 |
| 7* | 64.4 | +7.5 | 138.5 | 78.2 | 0 | — | 22.4 | 33.5 | 301.5 |
| 8 | 67.9 | +8.6 | 73.1 | 50.0 | 0 | 1.4 | 18.4 | 22.7 | 394.5 |
| 9* | 67.9 | −1.2 | 80.8 | 51.3 | 0 | — | 23.2 | 33.5 | 240.9 |
| 10 | 60.7 | −45.7 | 56.4 | 59.0 | 1.3 | 1.7 | 10.8 | 22.7 | 134.4 |
| 11* | 55.8 | −9.9 | 187.2 | 60.3 | 7.7 | 1.0 | 24.6 | 25.0 | 5.0 |
| 12* | 53.5 | −9.4 | 159.0 | 67.9 | 2.6 | 0.5 | 34.5 | 17.5 | 9.9 |
| 13* | 67.2 | −7.8 | 185.9 | 66.7 | 0 | 1.1 | 20.9 | 27.0 | — |

TABLE-continued

| Run No. | Paticle size (angstroms) | Birefringence (n) | Roughness H₁ | Roughness H₂ | Roughness H₃ | S/N (dB) | Envelope variation (%) | Adhesion (g) | Dropout number increase |
|---|---|---|---|---|---|---|---|---|---|
| 14* | 54.9 | −9.4 | 159.0 | 67.9 | 2.6 | — | 30.5 | 17.5 | — |
| 15* | 71.8 | −4.2 | 129.5 | 28.2 | 0 | 0.95 | 20.5 | 40.5 | — |
| 16* | 61.0 | +4.6 | 80.8 | 34.6 | 0 | 0.8 | 21.8 | 27.0 | — |
| 17* | 53.9 | −3.7 | 183.3 | 92.3 | 1.3 | 0.85 | 22.8 | 10.3 | — |

*Comparative examples

The physical properties of the PET substrates and of the magnetic recording tapes, shown in the aforesaid table, were determined as follows.

Surface roughness

Surface roughness of the substrate film is expressed in terms of height and density of projections present on the film surface. Film specimens are metallized thinly with aluminum and, then, height and density of projections are measured. The projection height is measured by using a surface finish microscope (NIKON Model BFM, supplied by Nippon Kogaku K.K.) employing a visible green monochromic light. The projection heights obtained are classified into the following three groups.

$H_1$: from 0.27 to 0.53 micron
$H_2$: form 0.54 to 0.80 micron
$H_3$: from 0.81 to 1.07 micron The projections having heights falling within the respective groups are counted in random samples having an area of 1.28 mm², and the projections are classified into the appropriate group $H_1$, $H_2$ or $H_3$. The projections having heights falling within the respective groups can be counted as follows. The microscope of 240 magnification is adjusted so that a photograph be obtained which has six to seven interference bands therein. The projections having heights falling within group $H_1$ are single ring figures having lengths of at least 2 mm as measured along the direction parallel to the interference bands. The projections having heights falling within groups $H_2$ and $H_3$ are double ring figures and triple ring figures, respectively. The number of projections in each group are expressed in terms of the number of projections present in the unit area of 1.0 mm².

Signal to noise ratio (S/N in dB)

Using a commercially available VHS type video tape recorder, a 50% white level signal is recorded on a tape specimen at the optimum recording current and, then, reproduced. Upon reproduction, the ratio (S/N) of the video demodulated signal to the noise involved therein is determined by using a video noise meter (Model 925C supplied by Shibasoku K.K.) A reference S/N ratio is similarly determined on a TDK standard tape (prepared by TDK Electronics Co., Ltd.). The S/N ratio is expressed in terms of the difference between the S/N ratio as determined on the tape specimen and the reference S/N ratio.

Envelope variation (in %)

Using a commercially available VHS type video tape recorder, a sine wave signal of 4 MHz frequency is recorded on a tape specimen at the optimum recording current and, then, reproduced. Upon reproduction, an output signal from the head amplifier is observed by using an oscilloscope having a band width of 100 MHz. The envelope variation "y" is determined from the peak-to-peak value "α" (mV P-P) and the valley-to-valley value "β" (mV P-P) according to the equation:

$$Y(\%) = [(\alpha - \beta)/\alpha] \times 100$$

Adhesion (in grams)

A double-coated adhesive tape is applied onto a mount paper having a thickness of approximately 200 microns. A tape specimen in the form of a strip having a width of 12.65 mm is applied onto the adhesive tape so that the strip is perpendicular to the adhesive tape and the magnetic material layer side of the strip is brought into contact with the adhesive tape. The sample, so prepared is immediately placed in the Instron tensile tester and the force in grams necessary to strip the tape at an angle of 180° is determined.

Dropout number increase

Using a commercially available VHS type video tape recorder, a three stair step signal is recorded on a tape specimen at the optimum recording current and, then, reproduced. During the reproduction, the number of dropout in output from the video head amplifier in 15 minutes is counted by using a dropout counter (made by NJS). The term "dropout" herein used refers to an output reduction of at least 18 dB, continuing for a period of at least 20μ seconds. The determination of the number of dropout is carried out at several locations on the tape specimen. The average number of dropout is referred to as "$v_1$". The aforesaid recording-reproducing operation is repeated three times at the same locations on the tape specimen. The average number of dropout as determined in the fourth (i.e. last) recording-reproducing operation is referred to as "$v_4$". The dropout number increase is the difference between $v_4$ and $v_1$, expressed by the equation:

Dropout number increase = $v_4 - v_1$

What we claim is:
1. A magnetic recording tape comprising a polyethylene terephthalate substrate and a magnetic material-containing layer closely adhered onto the substrate, characterized in that said polyethylene terephthalate substrate satisfies the formula

$$0.051 H_1 - 0.59A + 0.14\Delta n + 0.0015(H_2 - 66.67)^2 + 50.92 \leq 20$$

wherein A is the average particle size of the polyethylene terephthalate crystals as determined from the half height width by X-ray diffractometry, and $H_1$ is the average number of projections present in a unit area of 1 mm² on the surface of the substrate, which projections have a height falling within the range of from 0.27 to 0.53 micron, $H_2$ is the average number of projections similar to $H_1$ above but having a height falling within the range of from 0.54 to 0.80 micron, rather than 0.27 to 0.53 micron, and $\Delta n$ is the birefringence of the substrate, said surface projections being formed by incorporating a finely divided material, selected from the group consisting of finely divided kaolin and finely divided calcium carbonate, into said polyethylene terephthalate during the formation of said tape.

2. A magnetic recording tape as in claim 1 wherein said finely divided material is incorporated into said polyethylene terephthalate by adding said finely divided material into a polycondensation reaction mixture.

3. A magnetic recording tape as in claim 1, wherein said finely divided material is incorporated into said polyethylene terephthalate by adding said finely divided material into molten polyethylene terephthalate.

4. A magnetic recording tape comprising a polyethylene terephthalate substrate and a magnetic material-containing layer closely adhered onto the substrate, characterized in that said polyethylene terephthalate substrate satisfies the formula:

$$0.051H_1 - 0.59A + 0.14\Delta n + 0.0015(H_2 - 66.67)^2 + 50 - .92 \leq 20$$

wherein A is the average particle size of the polyethylene terephthalate crystals as determined from the half height width by X-ray diffractometry, and $H_1$ is the average number of projections present in a unit area of 1 mm² on the surface of the substrate, which projections have a height falling within the range of from 0.27 to 0.53 micron, $H_2$ is the average number of projections similar to $H_1$ above but having a height falling within the range of from 0.54 to 0.80 micron, rather than 0.27 to 0.53 micron, and $\Delta n$ is the birefringence of the substrate, said surface projections being formed by interesterifying dialkyl terephthalate and ethylene glycol in the presence of calcium acetate as an ester-interchange catalyst, followed by polycondensing the interesterified product, thereby to precipitate particles of calcium compounds represented by the following formula during the formation of said tape

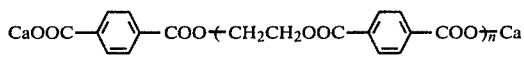

wherein n is an integer of from 0 to 3.

5. A magnetic recording tape as in claim 4, wherein said interesterifying dialkyl terephthalate and ethylene glycol in the presence of calcium acetate as an ester-exchange catalyst, followed by polycondensating the interesterified product, thereby to precipitate particles of calcium compounds is carried out during a polycondensation reaction step.

6. A magnetic recording tape as in claim 4, wherein particles of said calcium compounds are incorporated into a polycondensation reaction mixture.

* * * * *